March 15, 1932. E. KIBELE 1,849,096
PUMP PISTON
Filed Dec. 11, 1928
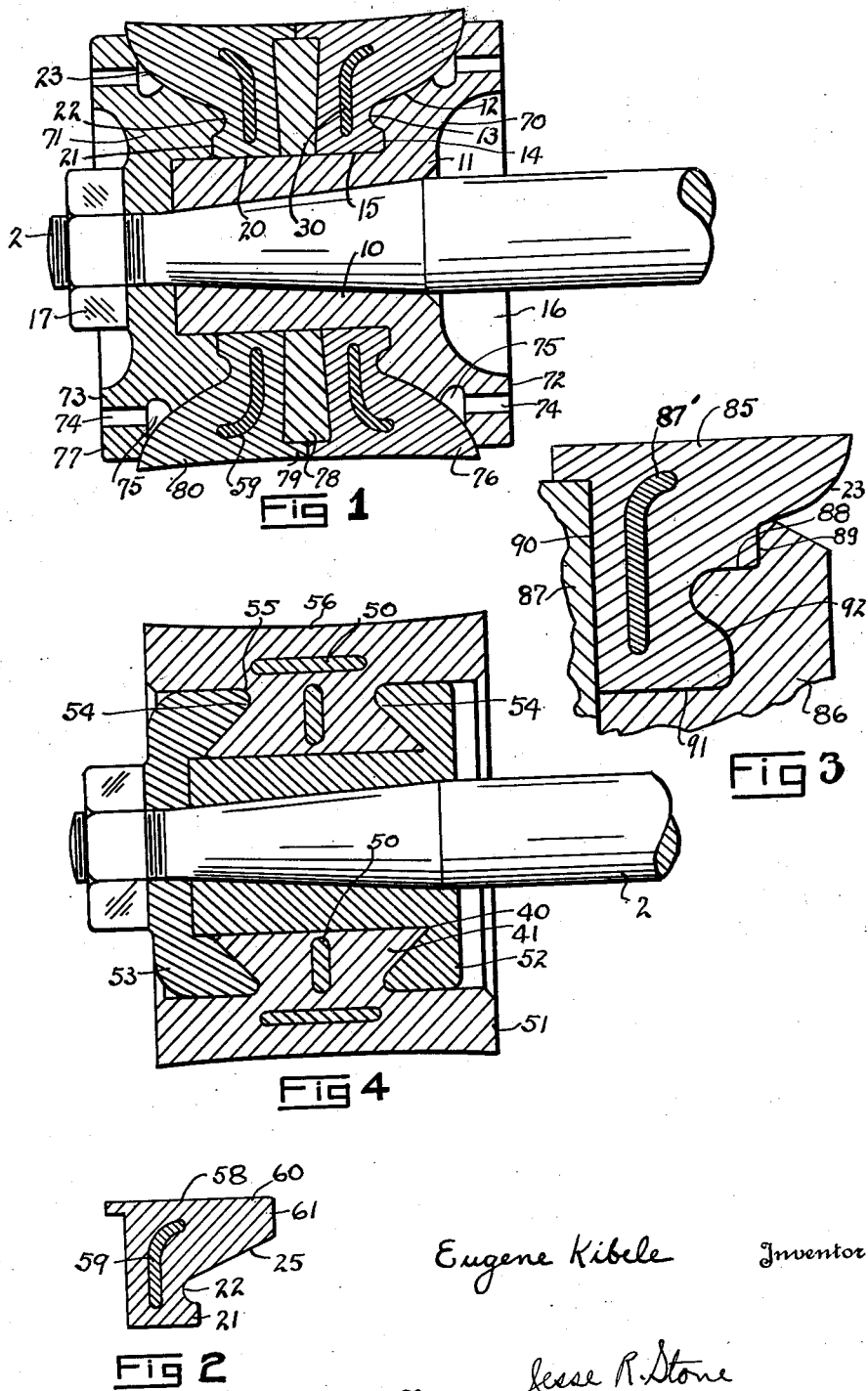

Patented Mar. 15, 1932

1,849,096

UNITED STATES PATENT OFFICE

EUGENE KIBELE, OF SAN ANTONIO, TEXAS

PUMP PISTON

Application filed December 11, 1928. Serial No. 325,297.

My invention relates to pistons such as are used in pumps and particularly the double acting pumps which are used in maintaining a flow of flushing fluid in well drilling operations.

The improvement of this application is somewhat similar to the disclosure in my prior Patents No. 1,564,484, No. 1,595,305 and No. 1,604,287 as well as my co-pending application No. 325,298 filed on even date.

It is one of the objects of my invention to provide a novel contour to the reinforcing rings and supporting members such as will maintain the ring in constant engagement with the cylinder wall.

Another object of my invention is to provide a resilient ring having a reenforcing material embedded therein in such a manner as to resist distortion of the ring.

I also aim to provide a piston wherein the hydraulic pressure is adapted to be exerted upon the skirt of the piston ring to assist in maintaining a fluid seal with the cylinder.

Still another object of my invention is to construct a piston ring having a novel contour such that a maximum clamping action may be exerted thereon but at the same time a portion of the ring will be free to contact the cylinder wall and be subjected to the hydraulic pressure of the pump.

Other and further objects of my invention will be readily apparent to those skilled in the art to which my invention appertains when the following description is taken in connection with the accompanying drawings wherein:

Fig. 1 is a central vertical section of the piston body and supporting members showing the rings and their parts in assembled position.

Fig. 2 is a cross section of one of the novel rings of my invention showing specifically the contour.

Fig. 3 is an enlarged detailed view showing another form which the ring may assume.

Fig. 4 is a vertical section similar to Fig. 1 and shows still another embodiment of my invention in which a single reinforced piston ring has been employed.

The reference character 2 indicates a piston rod having a tapered portion and threaded at its ends. A piston body or supporting member 11 is shown as firmly seated upon the tapered portion of the piston rod. This body or supporting member comprises a sleeve or core member 10 which has a substantial length but is of less length than the width of the entire assembled piston. The core 10 has a head which has a bowl shaped contour in cross section having a concave periphery 12 which merges with a rim 13 on the lower face of the head. The rim 13 is outstanding from the inner portion of the head whereby a groove 14 is formed where the head merges at right angles with the core 10. Toward the outer edge of the periphery 12 an annular indentation 75 is formed. The periphery 12, however, continues past this indentation to form a circular surface parallel with the shaft 2. A flat face 72 forms the inner surface of the piston except for a concave central cavity 16 adjacent the piston rod 2.

The follower plate 71 is formed with a head 73 similar to the head 11 of the body which has the outer face 77 similar to the face 72. A plurality of inlets 74 are uniformly placed in each the head and the follower plate and lead into the indentation 75.

The piston ring is composed of two identical complementary sections which together are adapted to be clamped between the piston head and the follower plate and surround the core or sleeve 10. In the cross section the ring member appears as having a foundation 21 having an inner surface 20 contacting with the sleeve 10 and the outer edge of each section has a groove 22 adapted to seat about the rim 13. Beyond the grooves 22 each section is convexly flared as at 23 but extends radially beyond the edge of the flange.

I have also shown a stabilizer plate 78 as slidably mounted upon the core 10 and adapted to be retained between the ring sections. This stabilizer plate is preferably tapered so that it is widest at its periphery. Each ring section has a rib 79 which overlies substantially one-half of the stabilizer disc.

An annular ring of reinforcing material 59 is shown as embedded or vulcanized into the resilient material of the piston ring. These rings are preferably of rubber or any suitable composition which can readily be distorted by the clamping action of the supporting members. Each ring section has a skirt 76 which is adapted to be distorted by hydraulic pressure exerted during the working stroke of the piston. This hydraulic pressure is adapted to act upon the skirt 76 by entering the inlet 74 and the indentation 75, pressing the skirt firmly against the cylinder wall, and which has not been shown. The outer surface of the ring surface is preferably concaved as shown so that when the follower plate 71 is drawn up by means of the nut 17, pressure is applied both radially and axially to the ring members which causes distortion adjacent the ribs 79. It will be noted that the reenforcing material 59 is so arranged that it will tend to resist the distortion of the ring.

It is to be understood that the ring of this embodiment may be made undersize and by the clamping action of the supporting members be enlarged to extend tightly against the cylinder walls.

The ring section shown in Fig 2. is somewhat similar to the rings of the Fig. 1, the foundation 21 and groove 22 being identical, but the skirt portion 76 is not necessarily concave as the Fig. 1 embodiment, and is shown as beveled toward the rod at 25 to form a skirt having the faces 60 and 61 at right angles to each other. The face 58 is adapted to contact with the wall of the cylinder and be distorted by the clamping action of the supporting members to be expanded radially. The reenforcing material 59 has also been shown in this figure. This ring section may be used if desired with the hydraulic pressure arrangement of the supporting members as shown in Fig. 1, or the flange 77 may be cut out adjacent the indentation 75 so that the skirt is free to receive the hydraulic pressure directly.

Fig. 3 shows the assembly of another form of piston ring 85 in which the inner surface 91 is formed at right angles to the face 90 which contacts the stabilizer disc 87. Joining the surface 91 on the outer end is a reversed curve 92 which forms a foundation somewhat similar to the portion 21 of Fig. 1. A straight face 88 joins the outer end of the reversed curve 92 and connects with a radial surface 89 at right angles thereto. Connecting with the section 89 is a concave skirt portion 23 which is the same but somewhat shorter than the skirt portion 23 of Fig. 1. A reenforcing ring 87 is also shown as embedded in the packing ring in this embodiment.

Fig. 4 shows a still different embodiment of my invention in which the piston supporting member has a head 52 in which a lip 54 extends inwardly to join the body portion at an acute angle. The follower plate 53 of this form is formed identical with the head 52 so that the two flanges 54 when considered together form an annular ring having a trapezoidal section. The piston ring is shown in this form as being made up of a single ring member having a foundation portion 41 adapted to be clamped between the lips 54, and a skirt portion 51 which overlies the entire head 53 and having an inner surface 55 which is parallel to the piston rod 2. The similar contacting surface 56 is preferably concave. In this form I have shown a reenforcing material as disclosed in two ring members 50, one of which lies in a radial position and one in a longitudinal position. In this manner as the supporting members are clamped together the radial ring 50 resists lateral movement of the piston ring whereas the annular ring 50 resists radial distortion. It is intended, however, that these reenforcing materials admit of sufficient distortion to allow the piston ring to contact with the cylinder wall as the supporting members are clamped together.

I have shown the follower plate 53 as engaging the end of the sleeve of the body portion, but it is to be understood that when the piston is first assembled the follower plate may not contact with the end of the sleeve but will allow the ring to be clamped. The wear gradually takes place and in subsequent adjustment the ring is maintained in contact with the cylinder wall.

I have disclosed herein several embodiments of my present improvement which I believe to be entirely satisfactory and practical for the purpose in view. Nevertheless, it is to be understood that the several essential parts of the improved embodiment might be constructed in other alternative forms than it is here shown and it is accordingly to be understood that in the further development of the piston that I reserve the privilege of resorting to all such legitimate changes therein as may be fairly embodied within the spirit and scope of the invention as claimed.

Having described my invention what I desire to secure by Letters Patent is:

1. A piston for pumps, including in combination a core, a flange at each end thereof, each flange having a bowl-shaped outer face and an inwardly tapered periphery, a rib on the lower edge of said periphery and a groove between the rib and the core, an annular indentation in said periphery, a piston ring of larger outer circumference than said flanges, adapted to be engaged by said flanges, outwardly dished rigid rings spaced from said core to reenforce said ring, and inlets through said face to said indentation.

2. A piston for pumps including a core, flanges thereon at opposite ends of the same, each flange having an inner annular radially extending area, an inwardly extending rib outside the same, and an outwardly curved face outside said rib, a packing ring of compressible material between said flanges and fitting within the space between the same, said ring being of slightly larger external diameter than said flanges and adapted to be moved outwardly at each end when clamped in position, and metallic rings within said packing ring, the outer portion of said metallic rings being curved toward the ends of said piston and adapted to resist outward compression of said packing rings against the cylinder walls.

3. A piston for pumps including a core, flanges thereon at opposite ends of the same, each flange having an inner annular radially extending area, an inwardly extending rib outside the same, and an outwardly curved face outside said rib, a packing ring of compressible material between said flanges and fitting within the space between the same, said ring being of slightly larger external diameter than said flanges and adapted to be moved outwardly at each end when clamped in position, and metallic rings within said packing ring, the outer portion of said metallic rings being curved toward the ends of said piston and adapted to resist outward compression of said packing rings against the cylinder walls, said flanges having annular grooves on their inner faces and passages leading thereto to assist in deflecting said packing ring outwardly by fluid pressure.

In testimony whereof I hereunto affix my signature this 7th day of December, A. D. 1928.

EUGENE KIBELE.